(12) United States Patent
Rathmann et al.

(10) Patent No.: US 8,960,418 B2
(45) Date of Patent: Feb. 24, 2015

(54) MOTOR DRIVE OF A GEARLESS BELT CONVEYOR DRIVE SYSTEM

(71) Applicant: ABB Technology AG, Zürich (CH)

(72) Inventors: Boris Rathmann, Cottbus (DE); Ulf Richter, Cottbus (DE)

(73) Assignee: ABB Technology AG, Zürich (CH)

( * ) Notice: Subject to any disclaimer, the term of this patent is extended or adjusted under 35 U.S.C. 154(b) by 0 days.

(21) Appl. No.: 13/896,106

(22) Filed: May 16, 2013

(65) Prior Publication Data

US 2013/0306443 A1 Nov. 21, 2013

(30) Foreign Application Priority Data

May 16, 2012 (EP) ...................................... 12003852
Apr. 17, 2013 (EP) ...................................... 13164029

(51) Int. Cl.
| | |
|---|---|
| B65G 23/04 | (2006.01) |
| B65G 39/02 | (2006.01) |
| B65G 23/22 | (2006.01) |
| H02K 7/10 | (2006.01) |

(52) U.S. Cl.
CPC ................ *B65G 39/02* (2013.01); *B65G 23/22* (2013.01); *H02K 7/1008* (2013.01)
USPC ........................................................ 198/835

(58) Field of Classification Search
USPC ................................................ 198/835, 788
See application file for complete search history.

(56) References Cited

U.S. PATENT DOCUMENTS 1,750,237 A * 3/1930 Mayer .............................. 318/45
4,775,044 A * 10/1988 Hofling ......................... 198/330

(Continued)

FOREIGN PATENT DOCUMENTS

| | | |
|---|---|---|
| CA | 2 568 676 A1 | 5/2008 |
| DE | 10 2006 004 421 A1 | 8/2006 |

(Continued)

OTHER PUBLICATIONS

Schwulera, "Advanced Drive System Save up to 20% Energy" In: Electric Energy Conference (1987 : Adelaide, S. Aust), An International Conference on Electric Machines and Drives; Proceedings. Barton, ACT: Institution of Engineers, Australia, 1987: pp. 101-107.
European Search Report for EP 12003852.6 Oct. 30, 2012.

*Primary Examiner* — William R Harp
(74) *Attorney, Agent, or Firm* — Buchanan Ingersoll & Rooney PC (57) ABSTRACT

A motor drive for a gearless belt conveyor drive system, which includes a motor base frame, a torque arm mounted on the motor base frame or a conveyor baseplate, a rotationally symmetrical stator of a synchronous motor being fixedly held by the torque arm and a rotationally symmetrical rotor casing containing permanent magnet elements of the rotor of the synchronous motor. The rotor casing is directly mountable on a front end of a cylindrical belt conveyor pulley so that the permanent magnet elements of the rotor rotate around the stator and so that the symmetry axis of the rotor casing and the symmetry axis of the stator are aligned with each other and with a longitudinal axis of the belt conveyor pulley.

13 Claims, 5 Drawing Sheets

(56) References Cited

U.S. PATENT DOCUMENTS

| | | | |
|---|---|---|---|
| 4,960,186 A * | 10/1990 | Honda | 187/254 |
| 6,661,136 B1 | 12/2003 | Lee | |
| 6,722,493 B2 * | 4/2004 | Matsuoka et al. | 198/788 |
| 6,833,644 B1 | 12/2004 | Lee | |
| 7,195,107 B2 * | 3/2007 | Gauthier et al. | 187/259 |
| 7,543,700 B2 | 6/2009 | Simke et al. | |
| 2004/0124736 A1 | 7/2004 | Gauthier et al. | |
| 2006/0290223 A1 * | 12/2006 | Burri et al. | 310/179 |

FOREIGN PATENT DOCUMENTS

| | | |
|---|---|---|
| DE | 10 2006 036986 A1 | 2/2008 |
| DE | 10 2008 030200 A1 | 12/2009 |
| EP | 0 735 648 A1 | 10/1996 |
| EP | 1 411 620 A1 | 4/2004 |
| FR | 2 893 459 A1 | 5/2007 |

\* cited by examiner

MOTOR DRIVE OF A GEARLESS BELT CONVEYOR DRIVE SYSTEM

RELATED APPLICATION(S)

This application claims priority under 35 U.S.C. §119 to European Patent Application No. 12003852.6 filed in Europe on May 16, 2012, and European Patent Application No. 13164029.4 filed in Europe on Apr. 17, 2013, the entire contents of which are hereby incorporated herein by reference in their entireties.

FIELD

The disclosure relates to a motor drive for a gearless belt conveyor drive system, and for example, a gearless belt conveyor drive system comprising the motor drive.

BACKGROUND INFORMATION

In mining and other kinds of industry where large scale bulk material as well as pieces of goods are used handle and transport over considerable distances, belt conveyor systems are used. For example, to set a conveyor belt into motion, a conveyor drive unit can be driven by a belt drive pulley. The conveyor drive unit can include an electrical motor drive which is connected to the belt drive pulley by using a reduction gear. For example, it is known to use a direct drive, such as a slowly rotating electrical motor which is directly coupled to the drive pulley in a gearless fashion. A gearless belt conveyor drive system contains an electrical motor drive and a belt drive pulley which can be in direct mechanical connection. Such a gearless belt conveyor drive system can have the advantage that due to the elimination of the gear, less moving mechanical components are involved which can increase the reliability and life time of the conveyor drive system and thereby can reduce the maintenance costs.

Gearless belt conveyor drive systems have been known for some time. For example, Siemens introduced a gearless belt conveyor drive system in the article by Schwulera, R., "Advanced Drive System Saves up to 20% Energy", in: Electric Energy Conference 1987: Adelaide, S. Aust.: An International Conference on Electric Machines and Drives; Proceedings. Barton, ACT: Institution of Engineers, Australia, 1987: 101-107. The conveyor drive system contains two synchronous motors, the rotors of which are directly flanged to each side of the pulley shaft of the drive pulley and where the stators are then mounted so that the rotor windings may rotate inside the stators.

Another concept for a gearless belt conveyor drive system is described in U.S. Pat. No. 7,543,700 B2 and DE 10 2006 004 421 A1. There, the motor is a permanent magnet synchronous motor which is located inside a pulley body of the drive pulley, also called a drum shell, where the pulley body rotates about an axis. The stator of the motor can be fixed to the axis and the rotor with the permanent magnets can be fixed on the inside to the pulley body so that it can rotate together with the drive pulley about the stator.

The arrangement of the motor inside the pulley body can lead to various technical issues, for example, when used for a large scale belt conveyor system such as an overland conveyor where the power rate of one of the corresponding driving motors can reach up to 10 Megawatts. The pulley body can limit the physical size of the motor. Accordingly, the maximum available power density of the motor can limit the maximum possible power rate of the motor. This maximum power rate can lie at an exemplary maximum of not more than 5 Megawatt, which may not be sufficient to drive a large scale belt conveyor system. In addition, reliably removing the heat from the pulley body can also be an issue, which can be aggravated with increasing power density. As an alternative to increasing the power density, the size of the pulley body can be increased. However, an enlarged pulley body may be desired since the use of a different belt size and/or belt material can increase the costs of the belt conveyor system. In addition, the complexity of the manufacturing processes can increase with an increased size of the pulley body, while the manufacturing precision can deteriorate, for example, with respect to the evenness and roundness of the cylindrical pulley body.

SUMMARY

A motor drive for a gearless belt conveyor drive system is disclosed, the motor drive comprising: a motor base frame; a torque arm configured to be mounted with respect to the motor base frame; a rotationally symmetrical stator of a synchronous motor configured to be fixedly held by the torque arm; and a rotationally symmetrical rotor casing containing permanent magnet elements of a rotor of the synchronous motor, wherein the rotor casing is configured to be directly mountable on a front end of a cylindrical belt conveyor pulley so that the permanent magnet elements of the rotor are configured to rotate around the stator and so that a symmetry axis of the rotor casing and a symmetry axis of the stator are configured to align with each other, and with a longitudinal axis of the belt conveyor pulley upon installation.

A gearless belt conveyor drive system is disclosed comprising: a motor drive, the motor drive comprising: a motor base frame; a torque arm configured to be mounted on at least one of the motor base frame or on a conveyor baseplate; a rotationally symmetrical stator of a synchronous motor configured to be fixedly held by the torque arm; and a rotationally symmetrical rotor casing containing permanent magnet elements of a rotor of the synchronous motor, wherein the rotor casing is configured to be directly mountable on a front end of a cylindrical belt conveyor pulley so that the permanent magnet elements of the rotor are configured to rotate around the stator, and so that a symmetry axis of the rotor casing and a symmetry axis of the stator are configured to align with each other and with a longitudinal axis of the belt conveyor pulley; a cylindrical belt conveyor pulley, which is configured to be mounted so as to rotate around a longitudinal axis of the belt conveyor pulley; and at least one flange for fixedly connecting the belt conveyor pulley and the rotor casing of the motor drive.

BRIEF DESCRIPTION OF THE DRAWINGS

The disclosure is explained below with reference to the exemplary embodiments shown in the drawings. In the drawings.

DETAILED DESCRIPTION

In accordance with an exemplary embodiment, a motor drive is disclosed for a gearless belt conveyor drive system, which includes a motor base frame, a torque arm mounted on the motor base frame or on a conveyor baseplate, a rotationally symmetrical stator of a synchronous motor being fixedly held by the torque arm, a rotationally symmetrical rotor casing containing the permanent magnet elements of the rotor of the synchronous motor, where the rotor casing is directly mountable on a front end of a cylindrical belt conveyor pulley so that the elements of the rotor are rotary around the stator and so that the symmetry axis of the rotor casing and the symmetry axis of the stator are aligned with each other and with the longitudinal axis of the belt conveyor pulley.

In accordance with an exemplary embodiment, a synchronous motor with permanent magnets can be placed not inside the body of the belt conveyor pulley but can be made to be mountable to one of its outer ends. The synchronous motor can overcome problems with the limited motor power and with the removing of the motor heat. In contrast to the solution described by Schwulera, the rotor of the motor drive is not an inner but an outer rotor, for example, the rotor rotates around the stator. This concept allows for a design of the motor drive which can be optimized with respect to the power rate, the electrical efficiency and the physical size and weight of the motor. For example, the motor drive can become lighter and slimmer, which means that it can be handled much more easily during installation, servicing and maintenance. In addition, the concept for the motor drive can result in an increased cost efficiency of the resulting gearless belt conveyor drive system, compared to the system with synchronous motors with inner rotors, as cost savings can be achieved in other parts of the system than just the motor. For example, since due to the outer rotor concept the permanent magnets are subject to moderate temperatures of less than 120 degrees Celsius, no high-end permanent magnet material are needed. Further, the rotor can be easily disassembled, for transporting for example, since no rotor windings and no electrical connectors are contained.

In an exemplary embodiment of the motor drive, the motor base frame can be arranged to be slidable alongside a rail from an installation or servicing position to an operating position, and vice versa, and can be fixed to a conveyor baseplate or a conveyor foundation platform in the operating position. According to an exemplary embodiment, the motor base frame, together with any element or part of the motor drive which is mounted to it, can be separated from the belt conveyor pulley in order for the synchronous motor and/or the pulley to be serviced or in order to simplify the installation process. For example, in connection with large scale belt conveyor systems this can be used in underground mines, such as copper mines. The space in the tunnels of the mines can be naturally limited, while the power rate and accordingly the size of the motor drive can be comparatively large. When during installation, servicing or maintenance access to the rotor casing, the stator can be easily separated from it without requiring much space. Therefore, only the motor base frame together with the torque arm and the stator can be slid to the servicing position and the servicing can be performed directly in the tunnel.

In an exemplary embodiment, the rotor and the stator of the motor drive can be mounted on a same shaft or a same non-rotating axis as the belt conveyor pulley. In accordance with an exemplary embodiment, any impact of a possible bending in the motor base frame and/or the conveyor baseplate on the air gap between stator and rotor can be avoided, for example, if the base frame or baseplate is made of steel.

In an exemplary embodiment, the rotor casing can be arranged to be fixedly attached directly or indirectly to the motor base frame. In accordance with an exemplary embodiment, the complete motor drive can be easily separated from the pulley, so that direct access to the pulley can be given which could, for example, be exchanged without requiring much preparatory effort and without the need for first disassembling the motor.

In an exemplary embodiment of the motor drive, the rotor casing can be provided with cooling elements for convection cooling. For example, the cooling principle together with the outer rotor concept can result in a robust, simple and efficient cooling of the synchronous motor, which can makes the overall motor design energy- and cost efficient. In an exemplary embodiment, in addition to the cooling elements, forced cooling means can be provided for applying forced cooling to the motor drive and its rotor casing. For example, a cooling fan may be installed in proximity to the motor drive for creating forced air convection.

The gearless belt conveyor drive system according to the disclosure can includes a motor drive as described above, a cylindrical belt conveyor pulley which can be mounted so as to be rotary around its longitudinal axis and at least one flange for fixedly connecting the belt conveyor pulley and the rotor casing of the motor drive. Altogether, the gearless belt conveyor drive system can contain a comparatively small number of elements and can be constructed in a simple and modular way which can be mechanically robust.

In an exemplary embodiment of the gearless belt conveyor drive system, the belt conveyor pulley can be rotary mounted inside at least one antifriction bearing. Since the synchronous motor can be directly attached to the pulley, the motor can be designed without any bearing. For example, this can result in the possibility for a reduced air gap, which can lead to an increased power rate by maintaining the physical size of the motor. Further, no bearing in the synchronous motor can mean less wearing of the motor.

Figure 1:
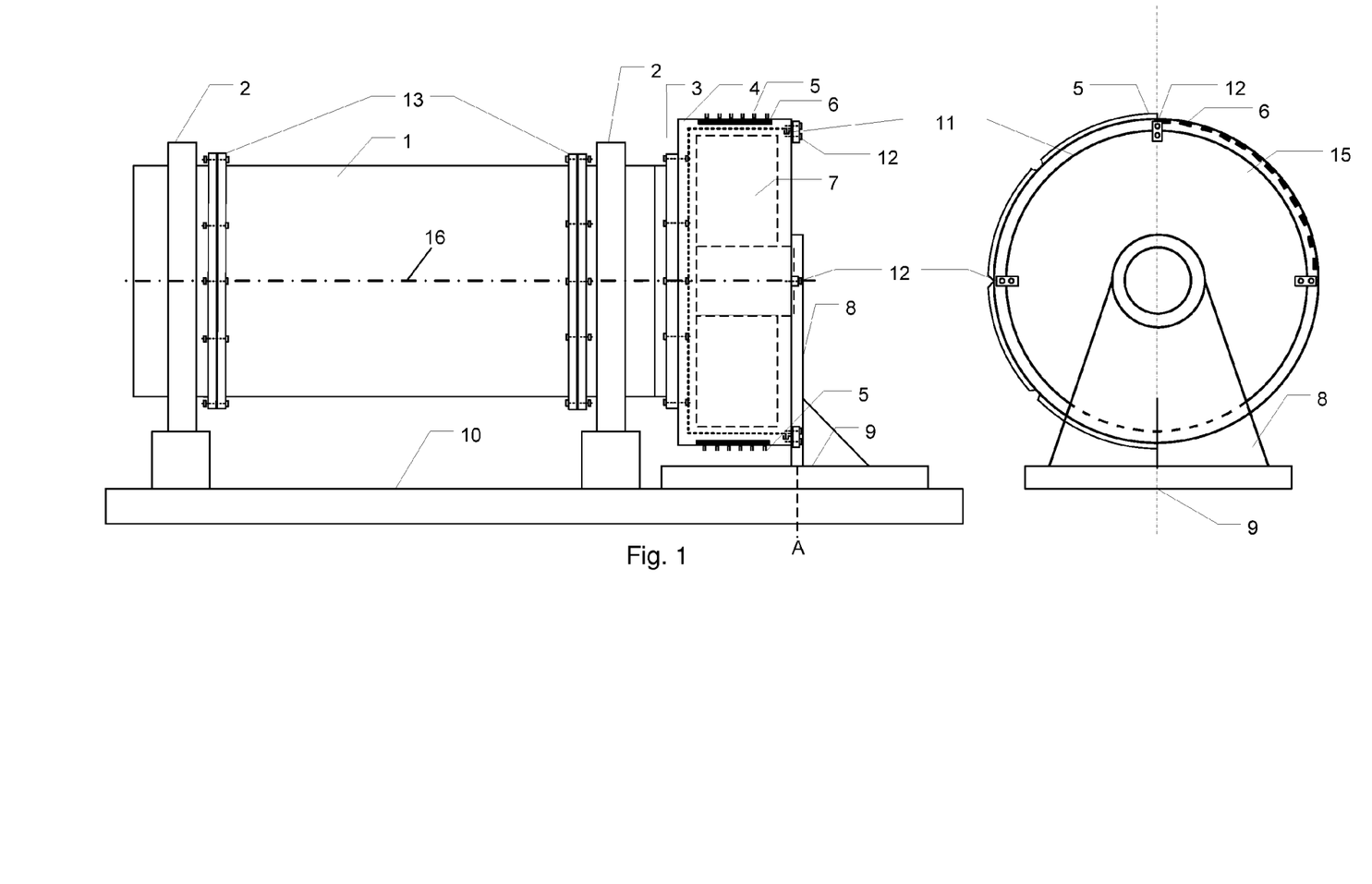
FIG. 1 is an exemplary embodiment of a gearless belt conveyor drive system in an operating state.

In FIG. 1, an exemplary embodiment of a gearless belt conveyor drive system is depicted containing a cylindrical belt conveyor pulley 1 for driving a conveyor belt. The belt conveyor pulley 1 can be mounted inside two antifriction bearings 2 so that the belt conveyor pulley can rotate around its longitudinal axis 16. The belt conveyor pulley 1 can contain two flanges 13 located on inner sides of the antifriction bearings 2, where the inner sides are the sides of flanges 13 which show towards the belt driving part of belt conveyor pulley 1. On an outer side of one of the antifriction bearings 2, belt conveyor pulley 1 ends in a further flange 3, which can be used for fixedly connecting a rotor casing 4 to the further flange 3 and thereby to the belt conveyor pulley 1.

The rotor casing 4 can contain permanent magnet elements 6, which can form a rotationally symmetrical rotor of a synchronous motor. On the outside of the rotor casing 4, cooling elements 5 can be attached to the casing for convection cooling. The permanent magnet elements 6 of the rotor can be arranged to rotate around a rotationally symmetrical stator 7, where the symmetry axis of the rotor casing 4 and the symmetry axis of the stator 7 can be aligned with each other and with the longitudinal axis 16 of the belt conveyor pulley 1.

The stator 7 can be fixedly held by a torque arm 8, where the torque arm 8 absorbs reaction forces or torques resulting from the rotational movement of the rotor, and the torque arm 8 can be mounted on a motor base frame 9. The motor base frame 9 can be arranged to be slidable alongside a rail from an operating position A to a servicing position B (see FIG. 2) and vice versa and to be fixed in the operating position A to a conveyor baseplate 10, also called a conveyor foundation platform 10. The conveyor baseplate 10 can for example be made of steel or concrete. For example, in cases where the conveyor baseplate or foundation platform is made of concrete, the gearless belt conveyor drive system can belong to a permanent installation. The conveyor baseplate or foundation platform may also be designed for the gearless belt conveyor drive system to be a mobile conveyor drive system which can be relocated.

Figure 2:
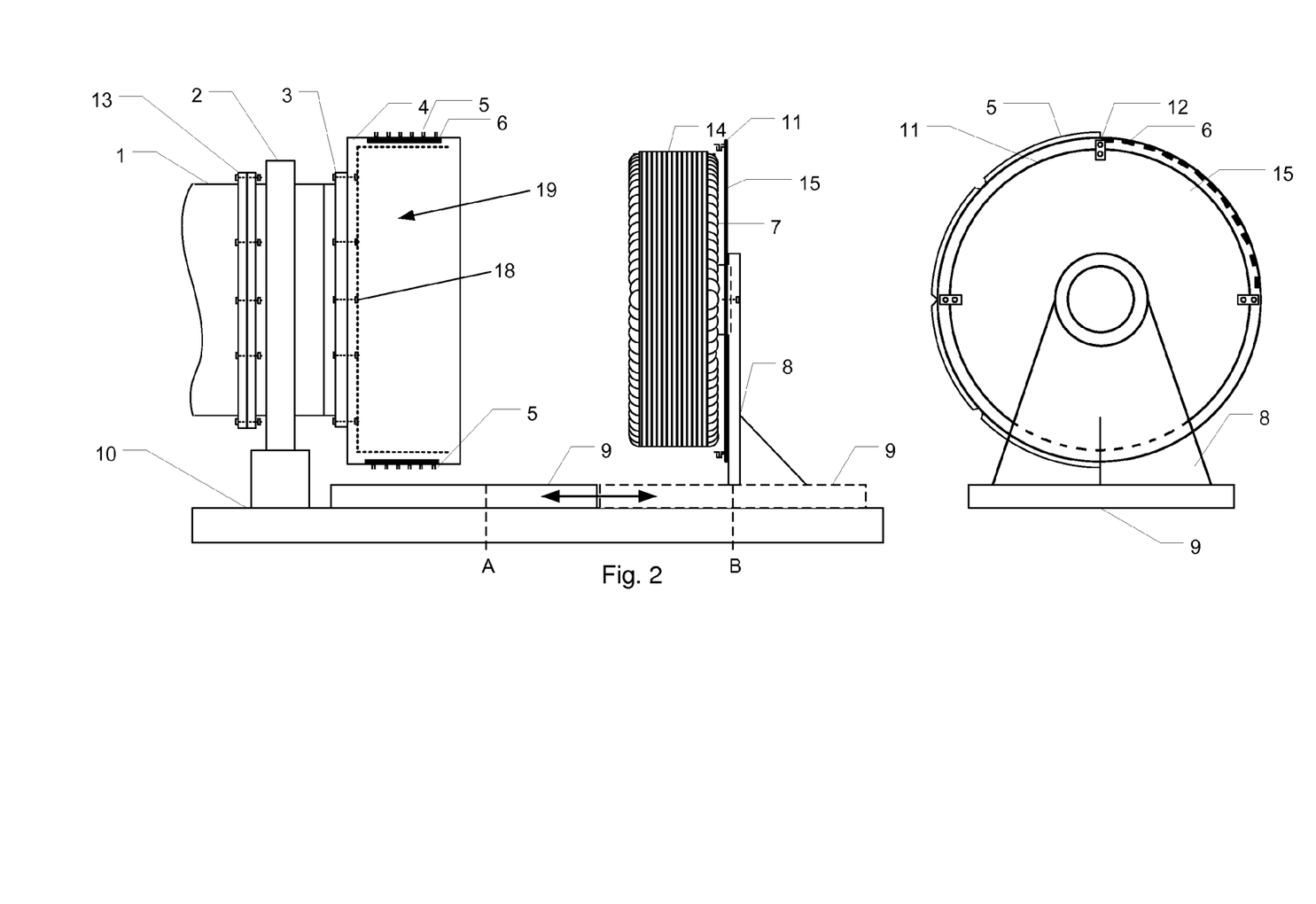
FIG. 2 is an exemplary servicing state of the exemplary embodiment as shown in FIG. 1.

As can be seen in FIG. 2, by sliding the motor base frame 9 to servicing position B, the stator 7 can be moved as well, together with the torque arm 8. Rotor casing 4 has an open front end showing away from the belt conveyor pulley 1. In the operating position A, the stator 7 can be placed such it extends through the open front end into the rotor casing 4. When being slid into the servicing position B, the stator 7 can be moved out of the rotor casing 4 through the open front end. In FIG. 2, a cover plate 15 can be shown, which in the operating position A covers the open front end of rotor casing 4. The cover plate 15 can be fixed to torque arm 8. A circular labyrinth seal 11 can be arranged concentrically at and attached to the cover plate 15. In operating position A, the labyrinth seal 11 can seal the inner room 19 of the rotor casing 4 against dust and/or humidity.

In servicing position B, the various elements of the rotor and stator of the synchronous motor can be easily reached. In case that the belt conveyor pulley 1 needs maintenance, the rotor casing 4 can be detached from the belt conveyor pulley 1 by unfastening the bolted connections 18, which extend through the further flange 3. This situation may for example be applicable when the gearless belt conveyor drive system is used outside of mining tunnels, for example, between the mine and a bulk storage depot, since no space restrictions need to be observed.

In accordance with an exemplary embodiment, for example, for easily reaching the belt conveyor pulley 1 during servicing, and for example, within a limited space, such as in a mining tunnel, is to use at least one bolted connection 12 for mounting the rotor casing 4 to the cover plate 15 and/or to the torque arm 8, as is indicated in FIG. 1. For example, bolted connections 18 can be removed as well. In that case, rotor and stator can be moved together to servicing position B and belt conveyor pulley 1 becomes directly accessible.

In FIGS. 1 and 2, the belt conveyor pulley can be a hollow cylinder, which includes two cylinder bearing sections, each placed inside one of the antifriction bearings 2. One of the two cylinder bearing sections ends directly in the outer flanges 13 and 3. Accordingly, the cylinder body takes over two mechanical tasks: the one of driving the conveyor belt and the one of transmitting the driving torque of the synchronous motor. In accordance with an exemplary embodiment, a hollow cylinder for the belt conveyor pulley can be used, which itself then functions as a shaft, since the belt conveyor pulley then has an increased stiffness with respect to belt tensile forces. For example, as a result, the belt conveyor pulley bends relatively less compared to a standard shaft onto which a pulley is mounted. In accordance with an exemplary embodiment, this can reduce the overall distortions in the conveyor drive system and can help to keep the air gap in the synchronous motor at a constant level, even allowing for a further reduction of the air gap.

Figure 3:
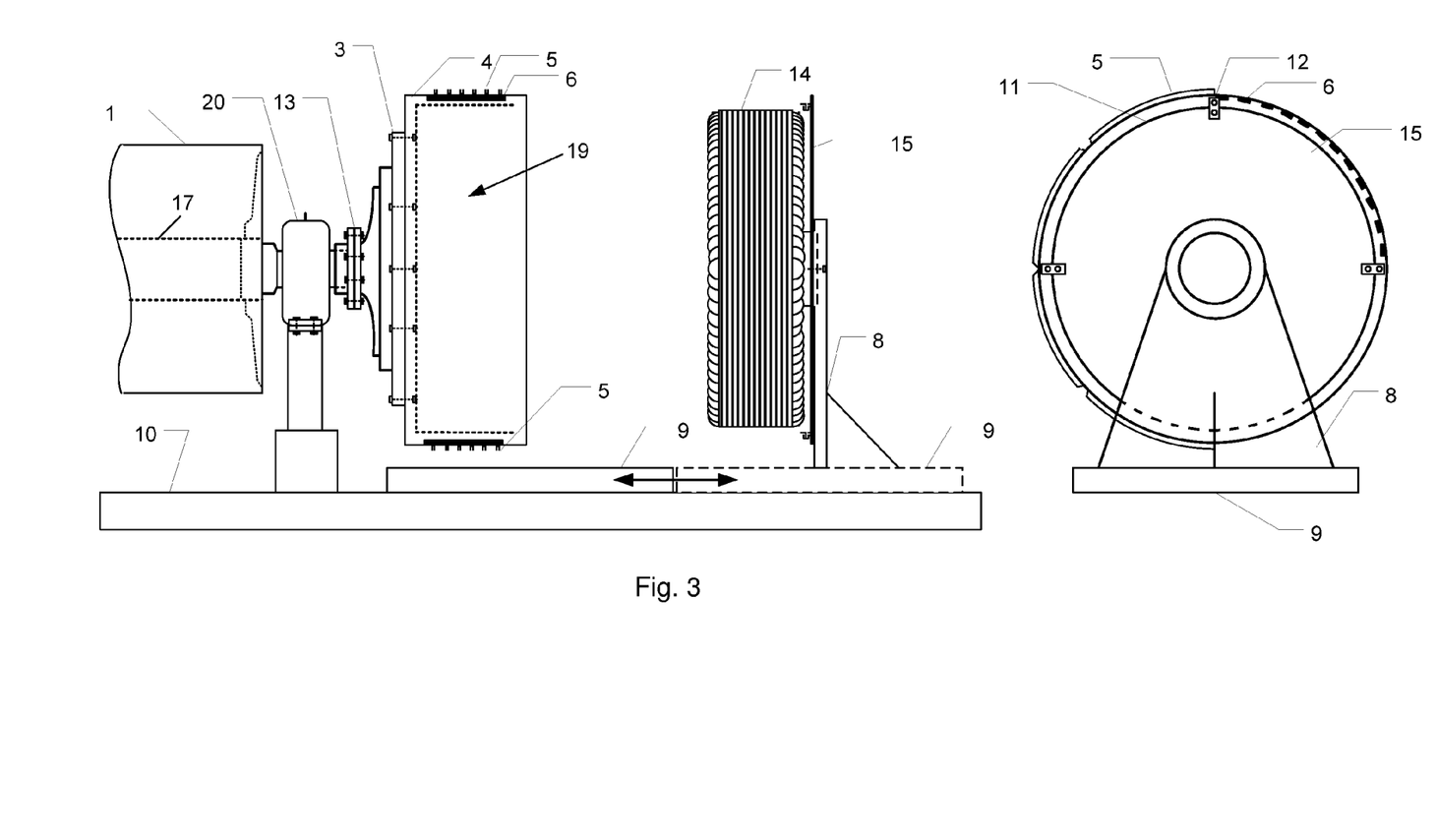
FIG. 3 is an exemplary embodiment of a gearless belt conveyor drive system.

In FIG. 3, an exemplary embodiment of a gearless belt conveyor drive system is shown, which differs from the system of FIGS. 1 and 2 in that the belt conveyor pulley contains a shaft 17, one end of which can be connected to the flanges 13 and 3 to which the rotor casing 4 is attached. In this exemplary embodiment, driving torque of the synchronous motor can be transmitted through the shaft, while the cylinder body of belt conveyor pulley 1 can solely drive the conveyor belt. In accordance with an exemplary embodiment, both flanges 13 and 3 can be located on the outer side of an antifriction bearing 20, for example, a roller bearing, with the inner side of the antifriction bearing 20 facing a front side of the cylindrical belt conveyor pulley 1.

Figure 4:
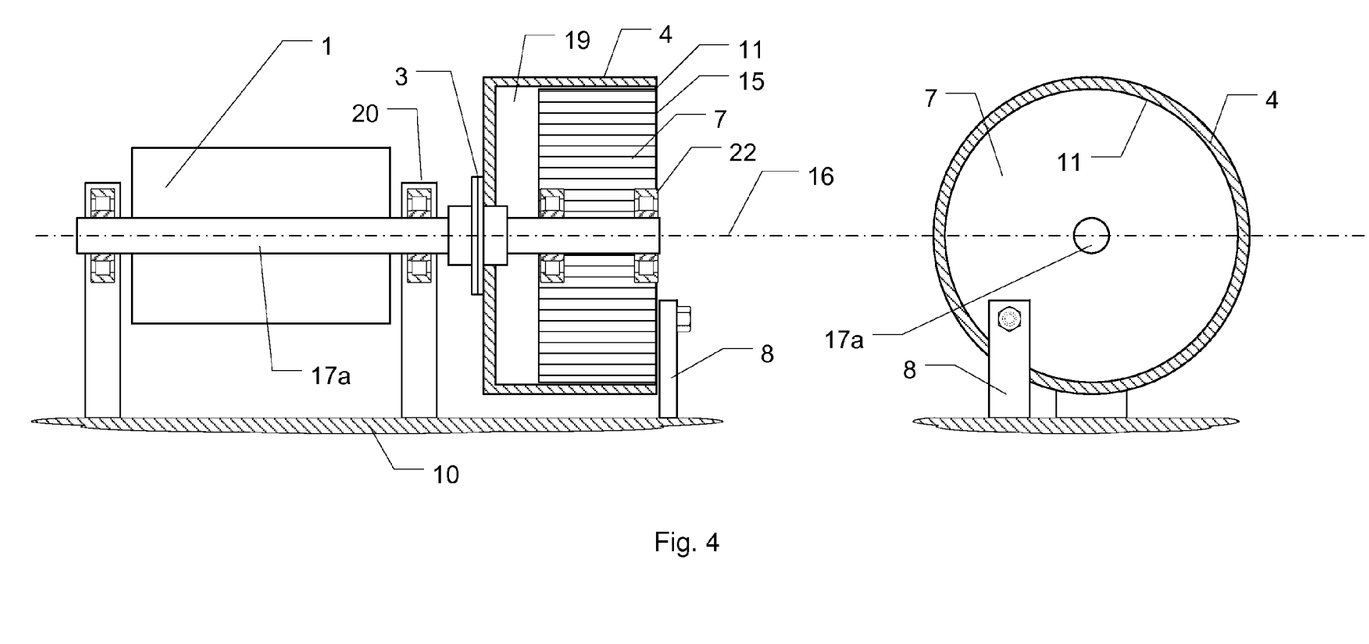
FIG. 4 is an exemplary embodiment of a gearless belt conveyor drive system.
Figure 5:
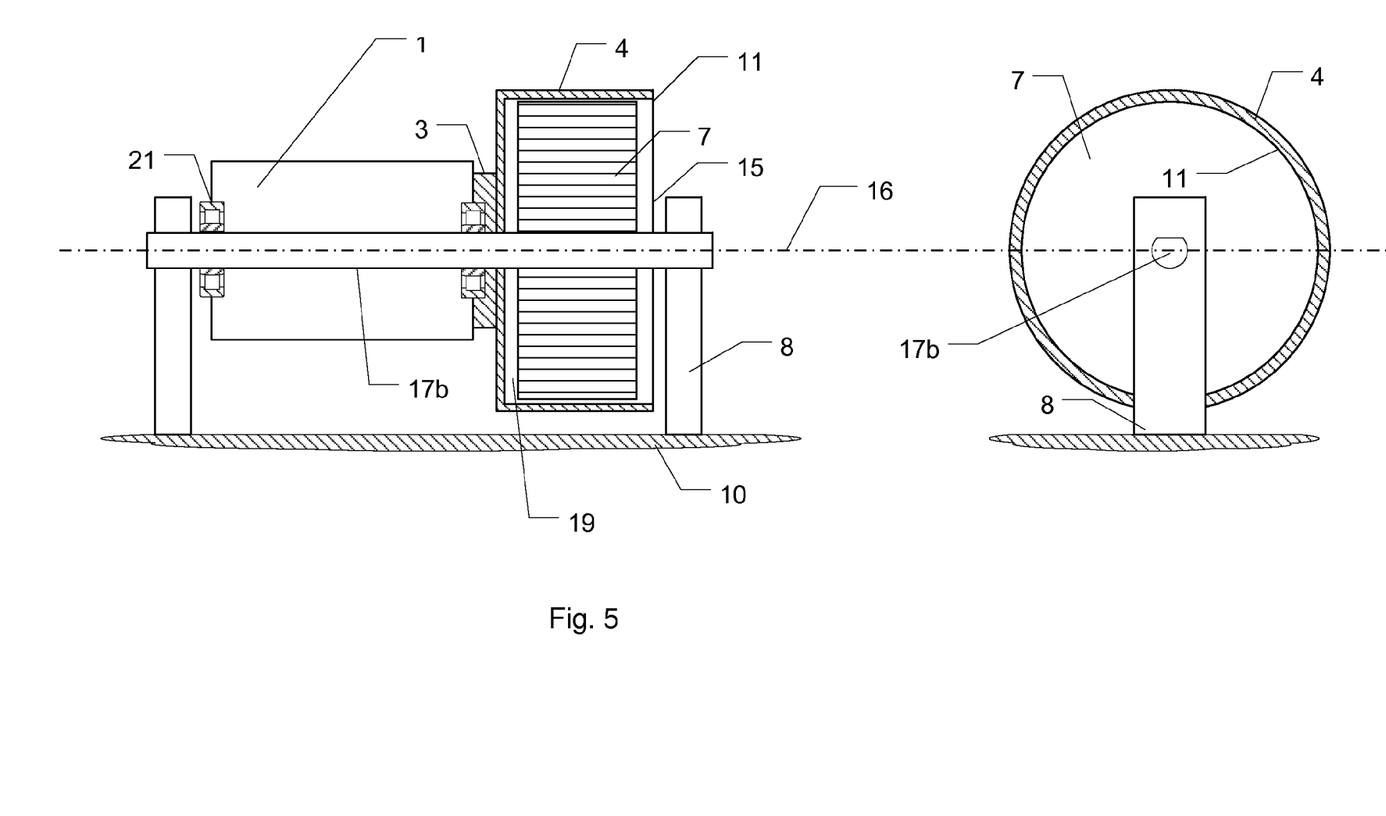
FIG. 5 is an exemplary embodiment of a gearless belt conveyor drive system.

In accordance with exemplary embodiments, gearless belt conveyor drive systems are shown in FIGS. 4 and 5, respectively. In FIGS. 4 and 5, the stator 7 and the rotor, which includes the rotor casing 4 and the permanent magnet elements 6, can be both mounted on the same shaft 17a (FIG. 4) or on the same non-rotating axis 17b (FIG. 5) as the belt conveyor pulley 1. Opposed to that, the rotor and stator of the embodiments as shown in FIGS. 1-3, for example, the motor drive for driving the belt conveyor pulley 1, can be arranged on a shaft of its own.

By mounting the stator and rotor on the same shaft or axis as the belt conveyor pulley, any impact of a possible bending in the conveyor baseplate 10 on the air gap between stator and rotor can be avoided, for example, if the baseplate is made of steel.

As can be seen from FIGS. 4 and 5, antifriction bearings 20, 21, 22, for example, roller bearings, can be used either for the stator 7 and to support the shaft 17a in case of the common shaft 17a, or for the belt conveyor pulley 1 and the rotor casing 4 in case of the common axis 17b.

With regard to installation and servicing, the exemplary embodiments as shown in FIGS. 4 and 5, for example, do not allow for the stator 7 to be easily separated from the rotor casing 4. Instead, the frame of the whole motor drive, including rotor and stator, can be separated from the belt conveyor pulley 1. For servicing purposes, the motor frame can then be moved into the servicing position by using a crane or by using a movable platform to be placed underneath the motor frame.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A gearless belt conveyor drive system comprising:
a motor drive, the motor drive comprising:
  a motor base frame;
  a torque arm configured to be mounted on at least one of the motor base frame or on a conveyor baseplate;
  a rotationally symmetrical stator of a synchronous motor configured to be fixedly held by the torque arm; and
  a rotationally symmetrical rotor casing containing permanent magnet elements of a rotor of the synchronous motor, wherein the rotor casing is configured to be directly mountable on a front end of a cylindrical belt conveyor pulley so that the permanent magnet elements of the rotor are configured to rotate around the stator, and so that a symmetry axis of the rotor casing and a symmetry axis of the stator are configured to align with each other and with a longitudinal axis of the belt conveyor pulley;
a cylindrical belt conveyor pulley, which is configured to be mounted so as to rotate around a longitudinal axis of the belt conveyor pulley;
at least one flange for fixedly connecting the belt conveyor pulley and the rotor casing of the motor drive; and
wherein the belt conveyor pulley is a hollow cylinder body, and the cylinder body is configured to directly end in the at least one flange.

2. The motor drive according to claim 1, comprising:
a rail; wherein the motor base frame is configured to be arranged to be slidable alongside the rail from an operating position to a servicing position and is configured to be fixed to the conveyor baseplate in the operating position.

3. The motor drive according to claim 1, wherein the rotor and the stator are configured to be mounted on at least one of a same shaft, or on a same non-rotating axis as the belt conveyor pulley.

4. The motor drive according to claim 1, wherein the rotor casing comprises:
an open front end, wherein the open front end will show away from the belt conveyor pulley, and wherein the rotor casing is configured to be mounted so that the stator extends through the open front end into the rotor casing.

5. A gearless belt conveyor drive system comprising:
a motor drive, the motor drive comprising:
a motor base frame;
a torque arm configured to be mounted on at least one of the motor base frame or on a conveyor baseplate;
a rotationally symmetrical stator of a synchronous motor configured to be fixedly held by the torque arm; and
a rotationally symmetrical rotor casing containing permanent magnet elements of a rotor of the synchronous motor, wherein the rotor casing is configured to be directly mountable on a front end of a cylindrical belt conveyor pulley so that the permanent magnet elements of the rotor are configured to rotate around the stator, and so that a symmetry axis of the rotor casing and a symmetry axis of the stator are configured to align with each other and with a longitudinal axis of the belt conveyor pulley;
a cylindrical belt conveyor pulley, which is configured to be mounted so as to rotate around a longitudinal axis of the belt conveyor pulley;
at least one flange for fixedly connecting the belt conveyor pulley and the rotor casing of the motor drive; and
wherein the belt conveyor pulley is a hollow shaft or mounted fixedly on a shaft with the shaft being supported by at least one antifriction bearing, and wherein one end of the shaft is configured to be connected to the at least one flange.

6. The motor drive according to claim 5, comprising:
a rail; wherein the motor base frame is configured to be arranged to be slidable alongside the rail from an operating position to a servicing position and is configured to be fixed to the conveyor baseplate in the operating position.

7. The motor drive according to claim 5, wherein the rotor and the stator are configured to be mounted on at least one of a same shaft, or on a same non-rotating axis as the belt conveyor pulley.

8. The motor drive according to claim 5, wherein the rotor casing comprises:
an open front end, wherein the open front end will show away from the belt conveyor pulley, and wherein the rotor casing is configured to be mounted so that the stator extends through the open front end into the rotor casing.

9. A gearless belt conveyor drive system comprising:
a motor drive, the motor drive comprising:
a motor base frame;
a torque arm configured to be mounted on at least one of the motor base frame or on a conveyor baseplate;
a rotationally symmetrical stator of a synchronous motor configured to be fixedly held by the torque arm; and
a rotationally symmetrical rotor casing containing permanent magnet elements of a rotor of the synchronous motor, wherein the rotor casing is configured to be directly mountable on a front end of a cylindrical belt conveyor pulley so that the permanent magnet elements of the rotor are configured to rotate around the stator, and so that a symmetry axis of the rotor casing and a symmetry axis of the stator are configured to align with each other and with a longitudinal axis of the belt conveyor pulley;
a cylindrical belt conveyor pulley, which is configured to be mounted so as to rotate around a longitudinal axis of the belt conveyor pulley;
at least one flange for fixedly connecting the belt conveyor pulley and the rotor casing of the motor drive; and
wherein the belt conveyor pulley is rotary mounted on a non-rotating axis by at least one antifriction bearing.

10. The gearless belt conveyor drive system according to claim 9, wherein the at least one flange is configured to be mounted to, or formed as part of, the rotor casing.

11. The motor drive according to claim 9, comprising:
a rail; wherein the motor base frame is configured to be arranged to be slidable alongside the rail from an operating position to a servicing position and is configured to be fixed to the conveyor baseplate in the operating position.

12. The motor drive according to claim 9, wherein the rotor and the stator are configured to be mounted on at least one of a same shaft, or on a same non-rotating axis as the belt conveyor pulley.

13. The motor drive according to claim 9, wherein the rotor casing comprises:
an open front end, wherein the open front end will show away from the belt conveyor pulley, and wherein the rotor casing is configured to be mounted so that the stator extends through the open front end into the rotor casing.

* * * * *